United States Patent
Kanno

(10) Patent No.: US 9,654,041 B2
(45) Date of Patent: May 16, 2017

(54) CONTROL APPARATUS FOR INTERNAL COMBUSTION ENGINE

(71) Applicant: TOYOTA JIDOSHA KABUSHIKI KAISHA, Toyota-shi, Aichi-ken (JP)

(72) Inventor: Yoshihito Kanno, Numazu (JP)

(73) Assignee: TOYOTA JIDOSHA KABUSHIKI KAISHA, Toyota-Shi (JP)

( * ) Notice: Subject to any disclaimer, the term of this patent is extended or adjusted under 35 U.S.C. 154(b) by 146 days.

(21) Appl. No.: 14/751,872

(22) Filed: Jun. 26, 2015

(65) Prior Publication Data

US 2015/0377164 A1    Dec. 31, 2015

(30) Foreign Application Priority Data

Jun. 30, 2014  (JP) .................. 2014-133851

(51) Int. Cl.
| | |
|---|---|
| *F02D 41/14* | (2006.01) |
| *H02P 9/02* | (2006.01) |
| *F02D 41/00* | (2006.01) |
| *F02D 41/30* | (2006.01) |
| *F02P 5/04* | (2006.01) |

(Continued)

(52) U.S. Cl.
CPC .............. *H02P 9/02* (2013.01); *F02D 29/02* (2013.01); *F02D 37/02* (2013.01); *F02D 41/0002* (2013.01); *F02D 41/107* (2013.01); *F02D 41/307* (2013.01); *F02P 5/045* (2013.01); *F02P 5/1504* (2013.01); *F02D 41/045* (2013.01); *F02D 2200/101* (2013.01); *F02D 2200/501* (2013.01); *F02D 2250/21* (2013.01); *F02D 2250/24* (2013.01); *Y02T 10/42* (2013.01); *Y02T 10/46* (2013.01)

(58) Field of Classification Search
CPC .......... F02D 41/14; F02D 37/02; F02D 29/02; F02D 41/002; F02D 41/107; F02D 41/307; F02D 41/045; F02D 2200/101; F02P 5/045; F02P 5/1504; H02P 9/02; Y02T 10/42; Y02T 10/46
See application file for complete search history.

(56) References Cited

U.S. PATENT DOCUMENTS

| | | | | |
|---|---|---|---|---|
| 7,239,954 | B2 * | 7/2007 | Huang ................ | F02D 41/0002 123/434 |
| 2010/0071658 | A1 | 3/2010 | Soejima et al. | |
| 2015/0353074 | A1 * | 12/2015 | Kinoshita .............. | B60K 6/445 701/22 |

FOREIGN PATENT DOCUMENTS

| | | |
|---|---|---|
| JP | 2000-161098 A | 6/2000 |
| JP | 2008-121511 A | 5/2008 |

* cited by examiner

*Primary Examiner* — Hieu T Vo
(74) *Attorney, Agent, or Firm* — Andrews Kurth Kenyon LLP

(57) ABSTRACT

A control apparatus for an internal combustion engine is provided. The control apparatus includes an ECU. The ECU is configured to change, in a stepped manner, an air-fuel ratio of the internal combustion engine so as to change over a combustion mode of the internal combustion engine between lean combustion and stoichiometric combustion, when an operating point of the internal combustion engine satisfies a first changeover condition that is defined by a rotational speed and a torque of the internal combustion engine. The first changeover condition is defined by the rotational speed and the torque that correspond to a predetermined intake air amount at which a thermal efficiency of the internal combustion engine is maintained before and after changeover of the combustion mode.

3 Claims, 8 Drawing Sheets

(51) Int. Cl.
*F02D 29/02* (2006.01)
*F02D 41/10* (2006.01)
*F02P 5/15* (2006.01)
*F02D 37/02* (2006.01)
*F02D 41/04* (2006.01)

CONTROL APPARATUS FOR INTERNAL COMBUSTION ENGINE

INCORPORATION BY REFERENCE

The disclosure of Japanese Patent Application No. 2014-133851 filed on Jun. 30, 2014 including the specification, drawings and abstract is incorporated herein by reference in its entirety.

BACKGROUND OF THE INVENTION

1. Field of the Invention

The invention relates to a control apparatus for an internal combustion engine that is applied to an internal combustion engine that can change over a combustion mode between lean combustion and stoichiometric combustion.

2. Description of Related Art

There is known a lean burn engine in which lean combustion can be carried out with a target air-fuel ratio set on a leaner side than a theoretical air-fuel ratio. In the lean burn engine, stoichiometric combustion is carried out at the time of acceleration, at the time of low rotation and low load, etc. With stoichiometric combustion, the internal combustion engine carries out combustion at the theoretical air-fuel ratio, which is on a richer side than the target air-fuel ratio of lean combustion, or at a target air-fuel ratio in the vicinity thereof. The internal combustion engine makes a changeover to stoichiometric combustion because a sufficient engine torque cannot be ensured by lean combustion at the time of acceleration, and because the temperature of a catalyst is likely to fall at the time of low rotation and low load.

As a control apparatus applied to this internal combustion engine, there is known an apparatus that performs the following procedure when the combustion mode needs to be changed over from stoichiometric combustion to lean combustion (Japanese Patent Application Publication No. 2008-121511 (JP 2008-121511 A)). When a request to change over the combustion mode from stoichiometric combustion to lean combustion is made, this control apparatus increases the amount of intake air by increasing the opening degree of a throttle, increases the amount of fuel injection, and restrains the torque of the engine from increasing as a result of these increases by retarding an ignition timing. Then, the control apparatus changes over the combustion mode from stoichiometric combustion to lean combustion by advancing the ignition timing after the lapse of a predetermined time, controlling the ignition timing in such a manner as to correspond to an operation state, and reducing the amount of fuel injection. Besides, Japanese Patent Application Publication No. 2000-161098 (JP 2000-161098 A) is regarded as an art related to the invention.

The control apparatus of Japanese Patent Application Publication No. 2008-121511 (JP 2008-121511 A) keeps the air-fuel ratio from remaining equal to an intermediate air-fuel ratio, which is between a target air-fuel ratio of stoichiometric combustion and a target air-fuel ratio of lean combustion, by changing the air-fuel ratio in a stepped manner, in consideration of the fact that the exhaust emission properties deteriorate when the air-fuel ratio remains equal to the intermediate air-fuel ratio during changeover of the combustion mode. In order to change the air-fuel ratio in this stepped manner, the control apparatus controls the amount of intake air to an intake air amount that is needed for the target air-fuel ratio after changeover of the combustion mode, and then changes the amount of fuel injection in a short time. A fluctuation in engine torque resulting from the control of the intake air amount is suppressed through the control of the ignition timing.

SUMMARY OF THE INVENTION

However, with the control apparatus of Japanese Patent Application Publication No. 2008-121511 (JP 2008-121511 A), the thermal efficiency may deteriorate before and after changeover of the combustion mode, and there is a room of improvement in the thermal efficiency before and after the changeover. Besides, there is a response delay in controlling the intake air amount. Therefore, the combustion mode may be frequently changed over. For example, the intake air amount needs to be reduced again because a changeover request shifts to stoichiometric combustion while the intake air amount is increased to make a changeover to lean combustion.

The invention provides a control apparatus for an internal combustion engine that restrains a thermal efficiency of an internal combustion engine from deteriorating as a combustion mode is changed over, and that suppresses a response delay in changing over the combustion mode.

A control apparatus for an internal combustion engine according to one aspect of the invention is provided. The internal combustion engine includes a torque suppression device that is configured to adjust an output torque of an output portion to which a torque of the internal combustion engine is transmitted. The control apparatus includes an ECU. The ECU is configured to change, in a stepped manner, an air-fuel ratio of the internal combustion engine so as to change over a combustion mode of the internal combustion engine between lean combustion and stoichiometric combustion, when an operating point of the internal combustion engine satisfies a first changeover condition that is defined by a rotational speed and a torque of the internal combustion engine. The first changeover condition is defined by the rotational speed and the torque that correspond to a predetermined intake air amount at which a thermal efficiency of the internal combustion engine is maintained before and after changeover of the combustion mode. The ECU is configured to control the torque suppression device such that the torque suppression device suppresses a fluctuation in the torque of the internal combustion engine that is generated as the air-fuel ratio changes in the stepped manner, in changing over the combustion mode.

According to this control apparatus, the combustion mode is changed over in accordance with the first changeover condition that is set based on the predetermined intake air amount at which the thermal efficiency of the internal combustion engine can be maintained before and after changeover of the combustion mode. Therefore, the thermal efficiency of the internal combustion engine can be restrained from deteriorating after the combustion mode is changed over. Besides, in changing over the combustion mode, the air-fuel ratio is changed in a stepped manner through the control of the fuel injection amount. Therefore, the response delay in changing over the combustion mode can be suppressed in comparison with a case where the intake air amount is controlled. Incidentally, maintaining the thermal efficiency means that the thermal efficiency does not deteriorate beyond a permissible range after the combustion mode is changed over. Accordingly, maintaining the thermal efficiency includes a case where the thermal efficiency before changeover of the combustion mode and the thermal efficiency after changeover of the combustion mode are equal to each other, and a case where these thermal efficiencies are confined within the permissible range.

In the aforementioned aspect of the invention, the torque suppression device may include a motor-generator that transmits a motor torque to the output portion. The ECU may be configured to execute power running control or regenerative control of the motor-generator such that the motor-generator suppresses the fluctuation in the torque of the internal combustion engine. According to this aspect of the invention, when the engine torque has increased as a result of changeover of the combustion mode, the increase in engine torque can be absorbed through regenerative control of the motor-generator. When the engine torque has decreased as a result of changeover of the combustion mode, a deficiency in engine torque can be supplemented through power running control of the motor-generator. Thus, the torque of the output portion of the internal combustion engine can be appropriately maintained during changeover of the combustion mode.

In the aforementioned aspect of the invention, the internal combustion engine may include an intake air amount adjustment device that is configured to adjust an amount of intake air sucked into the internal combustion engine. The torque suppression device may be configured to adjust an ignition timing of the internal combustion engine such that the torque suppression device adjusts the torque of the output portion. The ECU may be configured to determine, based on a second changeover condition that is defined by the rotational speed and the torque of the internal combustion engine, whether or not the combustion mode needs to be changed over, when an operating point of the internal combustion engine that is determined in accordance with a request to accelerate the internal combustion engine or a request to decelerate the internal combustion engine does not satisfy the first changeover condition. The second changeover condition may be set as a region in which the lean combustion is carried out and a region in which the stoichiometric combustion is carried out, which are defined by the rotational speed and the torque of the internal combustion engine. The ECU may be configured to control the intake air amount adjustment device such that the intake air amount adjustment device makes the intake air amount equal to an intake air amount that is needed for a target air-fuel ratio after changeover of the combustion mode, when the ECU determines that the combustion mode needs to be changed over. The ECU may be configured to change the air-fuel ratio of the internal combustion engine so as to change over the combustion mode of the internal combustion engine between lean combustion and stoichiometric combustion, when the ECU determines that the combustion mode needs to be changed over. The ECU may be configured to adjust the ignition timing such that the torque suppression device suppresses a fluctuation in the torque of the internal combustion engine that is generated as the intake air amount is controlled, in changing over the combustion mode.

As described above, with the control apparatus for the internal combustion engine according to the aforementioned aspect of the invention, the combustion mode is changed over in accordance with the first changeover condition that is set based on the predetermined intake air amount at which the thermal efficiency of the internal combustion engine can be maintained before and after changeover of the combustion mode. Therefore, the thermal efficiency of the internal combustion engine can be restrained from deteriorating after changeover of the combustion mode. Besides, in changing over the combustion mode, the air-fuel ratio is changed in a stepped manner by changing the fuel injection amount. Therefore, the response delay in changing over the combustion mode can be suppressed in comparison with a case where the intake air amount is controlled.

BRIEF DESCRIPTION OF THE DRAWINGS

Features, advantages, and technical and industrial significance of an exemplary embodiment of the invention will be described below with reference to the accompanying drawings, in which like numerals denote like elements, and wherein.

DETAILED DESCRIPTION OF EMBODIMENT

Figure 1:
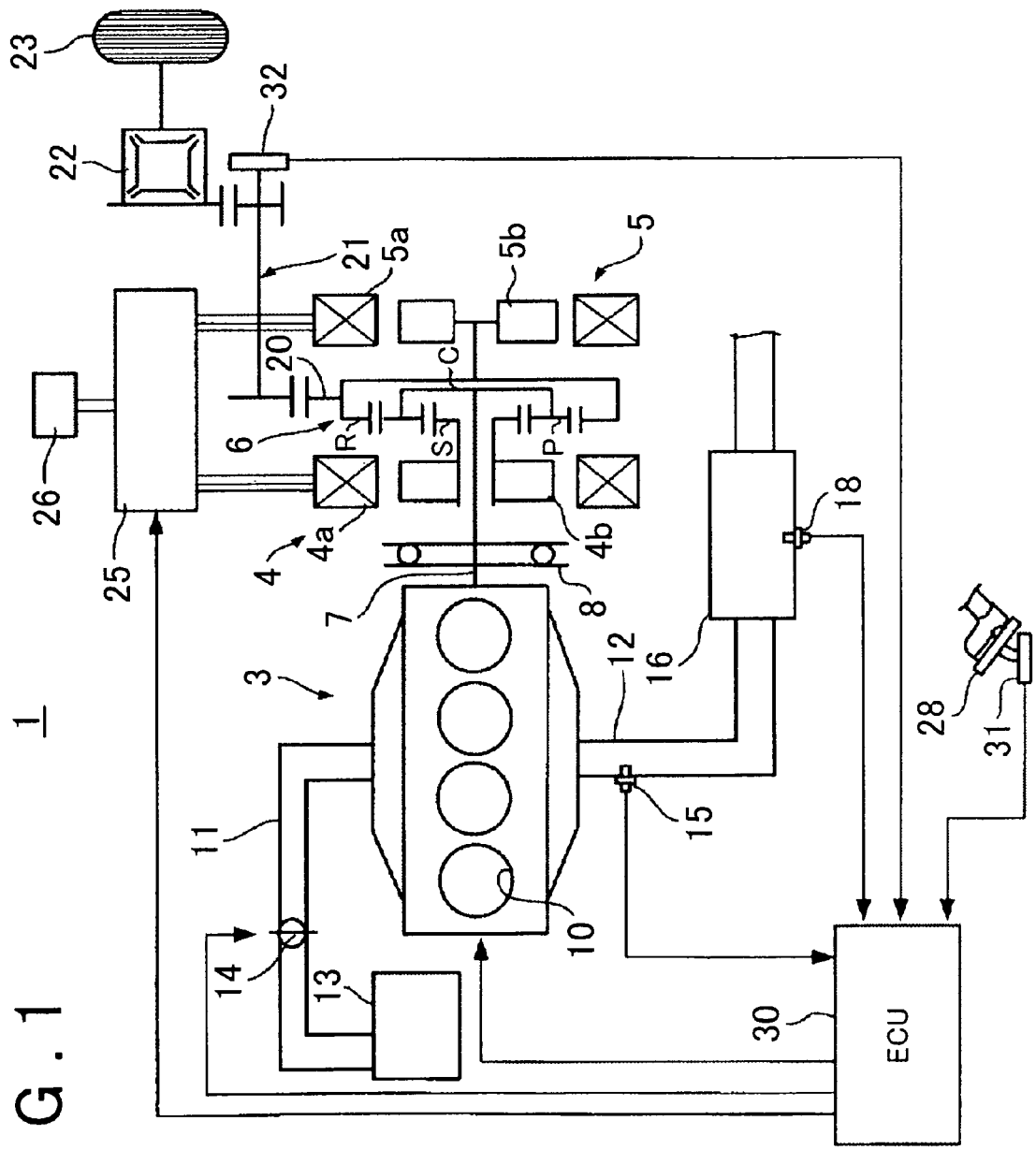
FIG. 1 is a view showing the outline of an overall configuration of a hybrid vehicle that is mounted with an internal combustion engine to which a control apparatus according to the embodiment of the invention is applied.

As shown in FIG. 1, a vehicle 1 is configured as a hybrid vehicle having a combination of a plurality of power sources. The vehicle 1 is equipped with an internal combustion engine 3 and two motor-generators 4 and 5 as power sources for running. The internal combustion engine 3 is an in-line four-cylinder spark ignition internal combustion engine that is equipped with four cylinders 10. The internal combustion engine 3 is configured as a so-called lean burn engine, and can change over the combustion mode between lean combustion and stoichiometric combustion. Lean combustion is a combustion mode in which an air-fuel ratio that is set on a leaner side than a theoretical air-fuel ratio is regarded as a target. Stoichiometric combustion is a combustion mode in which the theoretical air-fuel ratio, which is on a richer side than the air-fuel ratio of lean combustion, or an air-fuel ratio in the vicinity thereof is regarded as a target.

An intake passage 11 and an exhaust passage 12 are connected to the respective cylinders 10 of the internal combustion engine 3. The intake passage 11 is provided with an air cleaner 13 for filtering air, and a throttle valve 14 that can adjust the amount of intake air. The exhaust passage 12 is provided with an A/F sensor 15 that outputs a signal corresponding to an air-fuel ratio (an A/F) of the internal combustion engine 3. Besides, the exhaust passage 12 is provided with an NOx catalyst 16 that purifies noxious components in exhaust gas. The NOx catalyst 16 is a well-known occlusion reduction-type NOx catalyst. The NOx catalyst 16 is provided with a temperature sensor 18, in order to detect a temperature of the NOx catalyst 16.

The internal combustion engine 3 and the first motor-generator 4 are connected to a power split mechanism 6. An engine torque of the internal combustion engine 3 is transmitted to an output gear 20 as an output portion via the power split mechanism 6. The output gear 20 and the second motor-generator 5 are coupled to each other, and rotate integrally with each other. A motor torque of the second motor-generator 5 is transmitted to the output gear 20. The torque of the output gear 20 is transmitted to a driving wheel 23 via a reduction gear 21 and a differential gear 22. The first motor-generator 4 has a stator 4a and a rotor 4b. The first motor-generator 4 functions as a generator that generates electricity upon receiving the power of the internal combustion engine 3 split by the power split mechanism 6, and also functions as an electric motor that is driven by an AC electric power. By the same token, the second motor-generator 5 has a stator 5a and a rotor 5b, and functions as an electric motor and a generator. The respective motor-generators 4 and 5 are connected to a battery 26 via a motor control device 25. The motor control device 25 converts an electric power generated by each of the motor-generators 4 and 5 into a DC electric power, stores the DC electric power into the battery 26, converts the electric power of the battery 26 into an AC electric power, and supplies the AC electric power to each of the motor-generators 4 and 5.

The power split mechanism 6 is configured as a single pinion-type planetary gear mechanism. The power split mechanism 6 has a sun gear S, a ring gear R, and a planetary carrier C that retains a pinion P, which meshes with these gears S and R, in such a state that the pinion P can rotate around itself and around the planetary carrier C. The sun gear S is coupled to the rotor 4a of the first motor-generator 4, the ring gear R is coupled to the output gear 20, and the planetary carrier C is coupled to a crankshaft 7 of the internal combustion engine 3. Incidentally, a damper 8 is interposed between the crankshaft 7 and the planetary carrier C. The damper 8 absorbs vibrations of the internal combustion engine 3.

The control of the vehicle 1 is executed by an electronic control unit (an ECU) 30. The ECU 30 executes various kinds of control for the internal combustion engine 3 and the respective motor-generators 4 and 5. The main control executed by the ECU 30 will be described hereinafter. The ECU 30 calculates a required power required by a driver by referring to an output signal of an accelerator opening degree sensor 31 and an output signal of a vehicle speed sensor 32, and controls the vehicle 1 while making a changeover among various modes such that the system efficiency for the required power is optimized. For example, in a low-load region in which the thermal efficiency of the internal combustion engine 3 decreases, an EV mode in which the second motor-generator 5 is driven with combustion of the internal combustion engine 3 stopped is selected. Besides, when the internal combustion engine 3 alone cannot ensure a sufficient torque, a hybrid mode in which the internal combustion engine 3 and the second motor-generator 5 are used as drive sources for running is selected.

When the hybrid mode is selected, the required power is output through summation of an engine required power of the internal combustion engine 3 and a motor required power of the second motor-generator 5. The distribution of the engine required power and the motor required power is determined by various conditions such as the storage ratio of the battery 26 and the like. When the engine required power is specified, an operating point of the internal combustion engine 3 that can realize the engine required power is determined The operating point of the internal combustion engine 3 is controlled in such a manner as to move on an operation line L (see FIG. 2) that is set in advance, unless a special condition is fulfilled. Therefore, the operating point of the internal combustion engine 3 that realizes the engine required power is set on the operating line L in principle.

Figure 2:
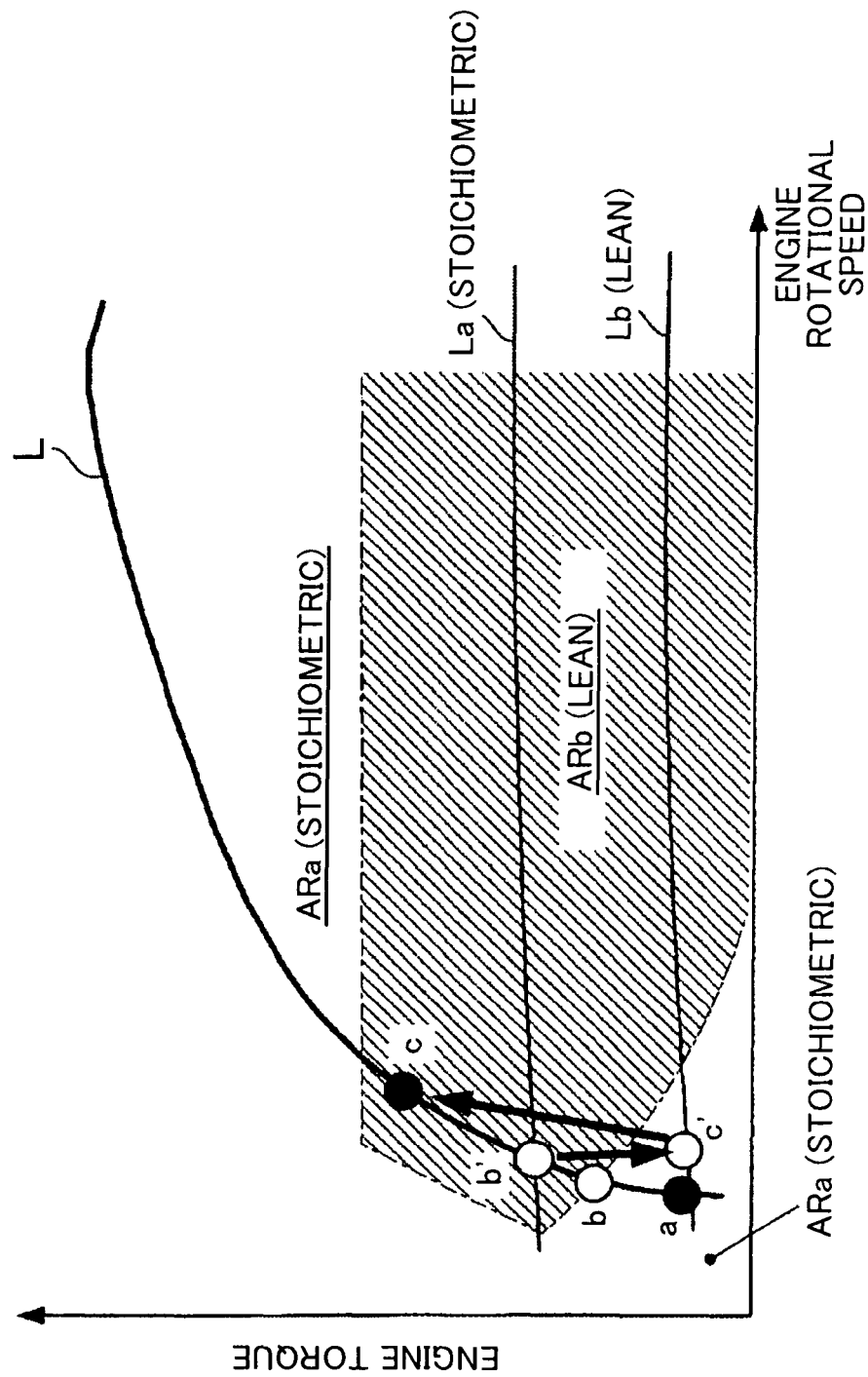
FIG. 2 is an illustrative view showing control contents.

In order to carry out each of lean combustion and stoichiometric combustion, the ECU 30 measures an air-fuel ratio by referring to an output value of the A/F sensor 15, and executes feedback control such that the deviation between the measured air-fuel ratio and a target air-fuel ratio in the current combustion mode decreases. The combustion mode is changed over based on a first changeover condition and a second changeover condition. FIG. 2 shows this first changeover condition and this second changeover condition. The second changeover condition is set as a stoichiometric combustion region ARa and a lean combustion region ARb. The first changeover condition is set as a stoichiometric combustion changeover line La and a lean combustion changeover line Lb. This first changeover condition and this second changeover condition are defined by an engine rotational speed and an engine torque. The stoichiometric combustion region ARa as part of the second changeover condition is a region in which stoichiometric combustion should be carried out, and is set as a high-load (high-engine torque) region and a low-rotation low-load region. The lean combustion region ARb as part of the second changeover condition is a region in which lean combustion should be carried out, and a region other than the stoichiometric combustion region ARa is allocated thereto. Changeover of the combustion mode through the use of the stoichiometric combustion region ARa and the lean combustion region ARb, which constitute this second changeover condition, is regarded as a comparative example.

In the present embodiment of the invention, a distinction in usage is made between second changeover control for changing over the combustion mode based on the stoichiometric combustion region ARa and the lean combustion region ARb as the second changeover condition, and first changeover control for changing over the combustion mode based on the stoichiometric combustion changeover line La and the lean combustion changeover line Lb as the first changeover condition, in accordance with the degree of a request to accelerate the internal combustion engine or a request to decelerate the internal combustion engine. In particular, a feature different from that of the comparative example lies in changing over the combustion mode based on the stoichiometric combustion changeover line La and the lean combustion changeover line Lb, which constitute the first changeover condition.

Figure 3:
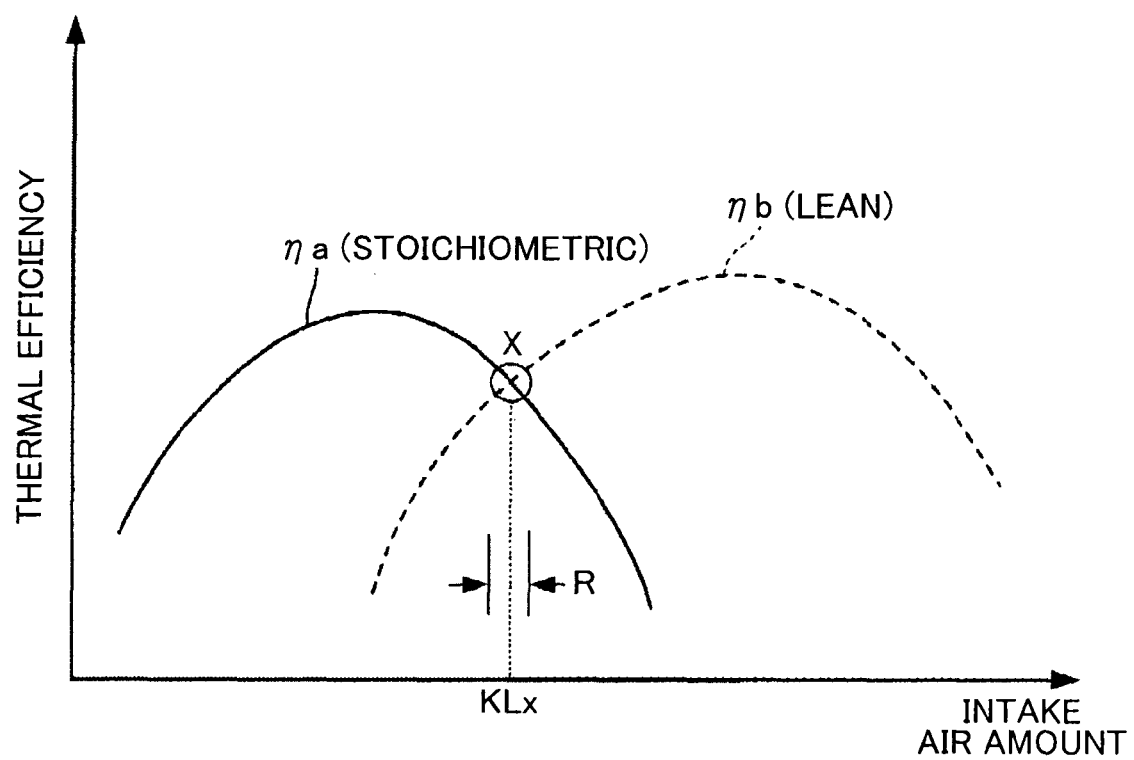
FIG. 3 is a view showing a relationship between an intake air amount and a thermal efficiency as to each of stoichiometric combustion and lean combustion.
Figure 4:
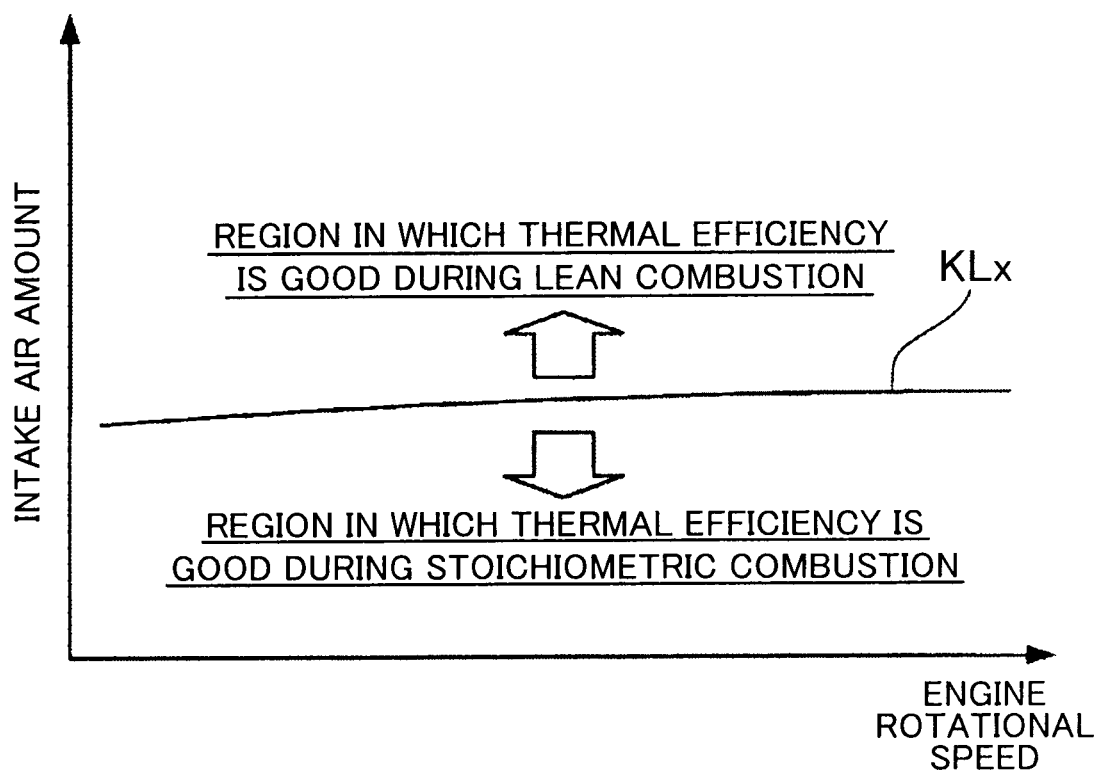
FIG. 4 is a view showing a predetermined intake air amount for each engine rotational speed.

This stoichiometric combustion changeover line La and this lean combustion changeover line Lb are set based on an engine torque and an engine rotational speed that correspond to a predetermined intake air amount at which the thermal efficiency of the internal combustion engine 3 can be maintained before and after changeover of the combustion mode. As shown in FIG. 3, the thermal efficiency in each of the combustion modes changes in accordance with the intake air amount, and curves ηa and ηb of the thermal efficiencies of stoichiometric combustion and lean combustion have different peaks. The curve ηa of the thermal efficiency of stoichiometric combustion and the curve ηb of the thermal efficiency of lean combustion intersect with each other at an intersection point X. The intake air amount at the intersection point X is equivalent to a predetermined intake air amount KLx. The two curves ηa and ηb exist for each engine rotational speed, with a tendency similar to that of FIG. 3. FIG. 4 shows, with respect to the engine rotational speed, the predetermined intake air amount KLx that is obtained from the intersection point of the two curves ηa and ηb at each engine rotational speed.

As can be understood from FIGS. 3 and 4, the thermal efficiency is lower when stoichiometric combustion is carried out on a higher side than the predetermined intake air amount KLx than when lean combustion is carried out with the same intake air amount. On the contrary, the thermal efficiency is lower when lean combustion is carried out on a lower side than the predetermined intake air amount KLx than when stoichiometric combustion is carried out with the same intake air amount. Accordingly, if a changeover from stoichiometric combustion to lean combustion and a changeover from lean combustion to stoichiometric combustion are carried out with the predetermined intake air amount KLx, the thermal efficiency is maintained before and after changeover of the combustion mode. As a result, the thermal efficiency can be restrained from deteriorating after changeover of the combustion mode. This is regarded as the first changeover condition of the combustion mode.

The engine torque of the internal combustion engine 3 is correlated with the fuel injection amount. Therefore, the amount of fuel injection is larger when stoichiometric combustion is carried out than when lean combustion is carried out with the same intake air amount. Accordingly, the engine torque in the case where stoichiometric combustion is carried out with the predetermined intake air amount KLx is higher than the engine torque in the case where lean combustion is carried out with the predetermined intake air amount KLx. The predetermined intake air amount KLx exists for each engine rotational speed. Therefore, when a combination of the engine rotational speed and the engine torque in the case where stoichiometric combustion is carried out with the predetermined intake air amount KLx is diagrammatically represented, the stoichiometric changeover line La of FIG. 2 is obtained. On the other hand, the engine torque is lower when lean combustion is carried out than when stoichiometric combustion is carried out with the same intake air amount. Therefore, when a combination of the engine rotational speed and the engine torque in the case where lean combustion is carried out with the predetermined intake air amount KLx is diagrammatically represented, the lean changeover line Lb is obtained on a lower torque side than the stoichiometric combustion changeover line La.

In this manner, the stoichiometric combustion changeover line La and the lean combustion changeover line Lb are set based on the predetermined intake air amount KLx at which the thermal efficiency of the internal combustion engine 3 can be maintained before and after changeover of the combustion mode. Therefore, the combustion mode can be changed over in the state of the predetermined intake air amount KLx by changing the fuel injection amount and changing the air-fuel ratio in a stepped manner when the operating point of the internal combustion engine 3 crosses the stoichiometric combustion changeover line La or the lean combustion changeover line Lb, namely, when the first changeover condition of the combustion mode is fulfilled. Thus, the thermal efficiency of the internal combustion engine 3 is maintained before and after changeover of the combustion mode.

Next, a concrete example in the case where a changeover from stoichiometric combustion to lean combustion is made will be described with reference to FIG. 2, FIG. 5, and FIG. 6, while making a comparison between the control of changing over the combustion mode through the use of the stoichiometric combustion region ARa and the lean combustion region ARb as the second changeover condition (the comparative example) and the control of changing over the combustion mode through the use of the stoichiometric combustion changeover line La and the lean combustion changeover line Lb as the first changeover condition (the present embodiment of the invention).

As shown in FIG. 2, a concrete example in which a request for acceleration is made such that the operating point of the internal combustion engine 3 moves from a state of being operated at a point a to a point c will be described. The point a belongs to the stoichiometric combustion region ARa, and the point c belongs to the lean combustion region ARb. Accordingly, due to this request for acceleration, the region to which the operating point of the internal combustion engine 3 belongs changes from the stoichiometric combustion region ARa to the lean combustion region ARb.

Figure 5:
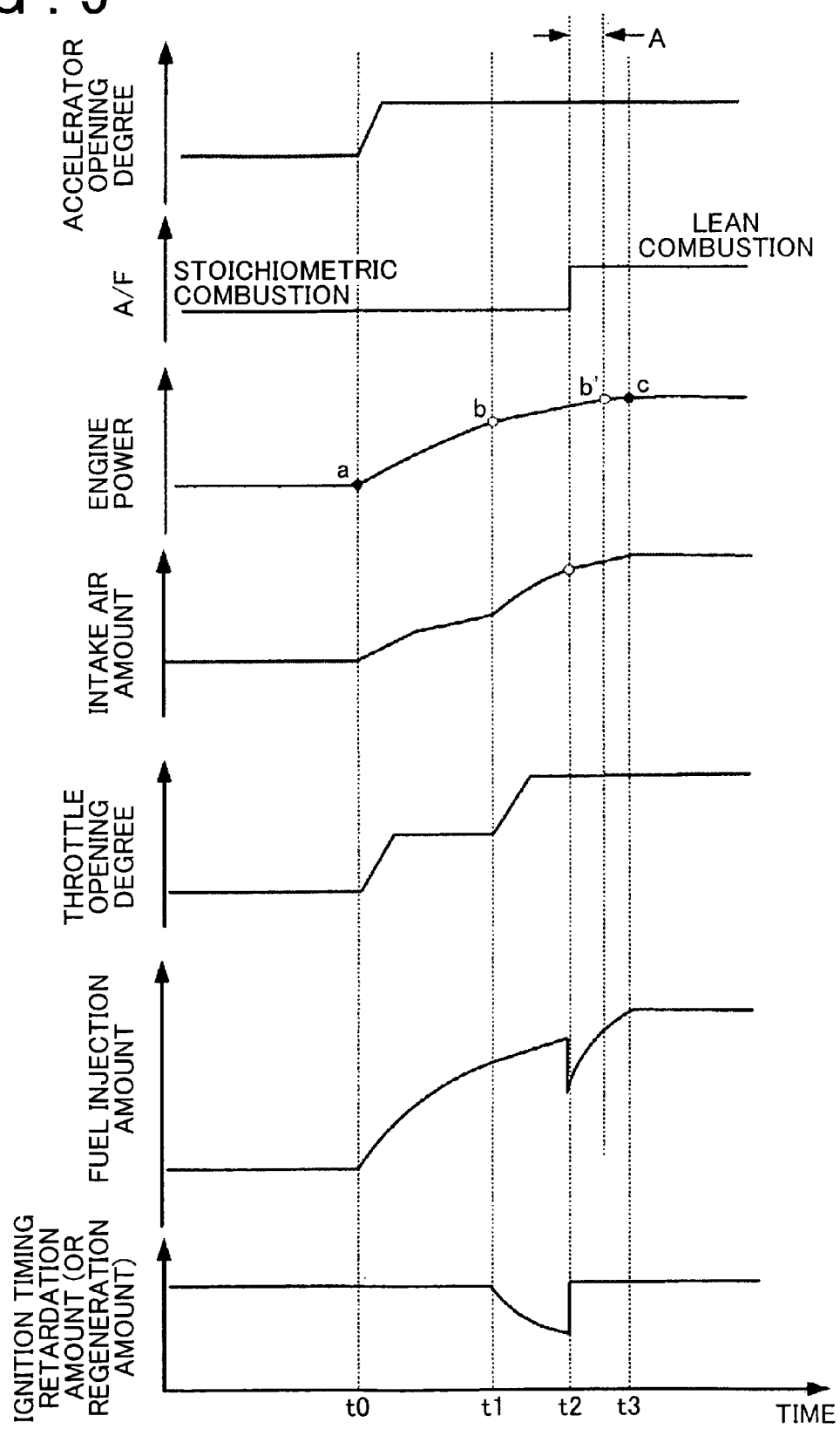
FIG. 5 is a timing chart showing an example of a control result according to a comparative example.

In the case of the comparative example of FIG. 5, when the accelerator opening degree increases at a time t0, the opening degree of the throttle valve 14 (the throttle opening degree) increases in cooperation with the accelerator opening degree. Then, the intake air amount increases with a delay from the change in the throttle opening degree. When the operating point of the internal combustion engine 3 reaches a point b that is located on a border between the stoichiometric combustion region ARa and the lean combustion region ARb, the throttle opening degree is further increased such that an intake air amount needed for lean combustion is obtained. As the throttle opening degree increases, the intake air amount increases. However, in order to hold the air-fuel ratio equal to the target air-fuel ratio of stoichiometric combustion, the fuel injection amount is also increased in accordance with the increase in the intake air amount. In order to restrain the engine torque from increasing due to the increase in the fuel injection amount, the ignition timing is gradually retarded from the time t1. When the intake air amount needed for lean combustion is reached at a time t2, the air-fuel ratio is changed, in a stepped manner, from the target air-fuel ratio of stoichiometric combustion to the target air-fuel ratio of lean combustion by reducing the fuel injection amount in a short time. Then, the fuel injection amount temporarily reduced at the time t2 is gradually increased until a time t3 when the point c as a target operating point is reached. Thus, the combustion mode is completely changed over from stoichiometric combustion to lean combustion.

In contrast, in the case of the present embodiment of the invention, even when the operating point of the internal combustion engine 3 reaches the point b located on the border between the stoichiometric combustion region ARa and the lean combustion region ARb at the time t1, the throttle opening degree is maintained until the time t2 when a point b' on the stoichiometric changeover line La is reached. When the stoichiometric changeover line La is crossed at the time t2, the air-fuel ratio is changed, in a stepped manner, from the target air-fuel ratio of stoichiometric combustion to the target air-fuel ratio of lean combustion by reducing the fuel injection amount in a short time. Due to this stepped change in the air-fuel ratio, the engine power decreases to a point c' as indicated by an arrow in FIG. 2. In order to compensate for a deficiency in the torque of the output gear 20 resulting from the decrease, power running control of the second motor-generator 5 is executed from the time t2. Thus, the discharge amount of the battery 26 increases. In order to change the operating point of the internal combustion engine 3 from the point c' to the point c, the throttle opening degree is further increased to increase the intake air amount from the time t2. Meanwhile, in order to hold the air-fuel ratio equal to the target air-fuel ratio of lean combustion, the temporarily reduced fuel injection amount is increased. This control is continued until the time t3 when the intake air amount needed for lean combustion is reached and the operating point of the internal combustion engine 3 reaches the target point c.

In the comparative example of FIG. 5, the ignition timing is gradually retarded from the time t1 to restrain the engine torque from increasing due to an increase in the fuel injection amount. Therefore, the thermal efficiency of the internal combustion engine 3 deteriorates due to the retardation of the ignition timing. Furthermore, in the comparative example, the internal combustion engine is operated with lean combustion from the time t2 when the intake air amount reaches the intake air amount needed for lean combustion until the point b' on the stoichiometric combustion changeover line La is reached. In this period A, the operating point of the internal combustion engine 3 is located on a lower torque side than the stoichiometric combustion changeover line La, so good thermal efficiency is achieved when stoichiometric combustion is maintained. That is, in the comparative example, the internal combustion engine is operated with lean combustion in the period A in which good thermal efficiency is achieved when stoichiometric combustion is maintained, so the thermal efficiency deteriorates.

Figure 6:
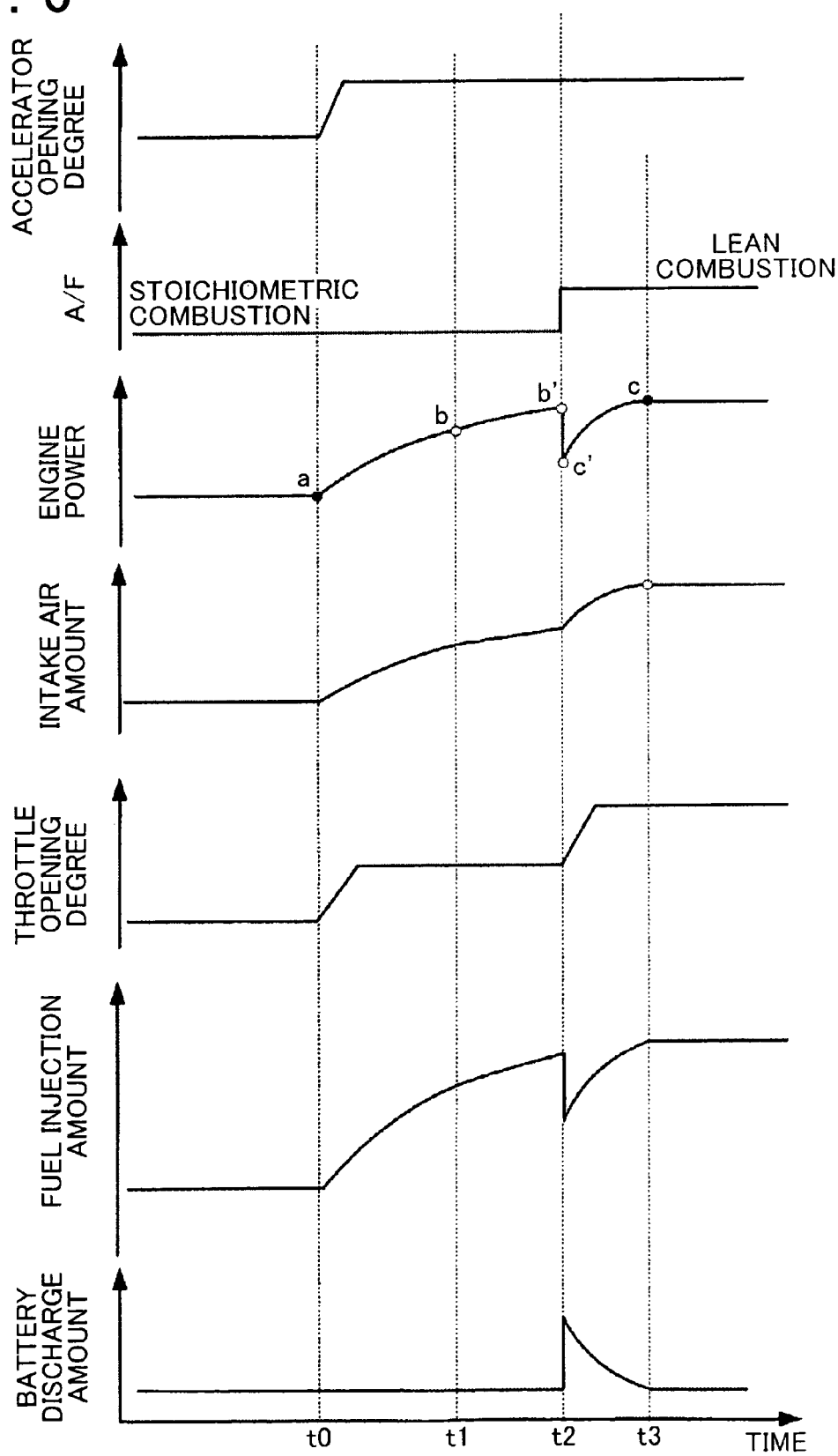
FIG. 6 is a timing chart showing an example of a control result according to the present embodiment of the invention.

In contrast, according to the present embodiment of the invention shown in FIG. 6, when the stoichiometric combustion changeover line La is crossed at the time t2, a changeover is made from stoichiometric combustion to lean combustion, and the thermal efficiency of the internal combustion engine 3 is maintained before and after the changeover. Therefore, the thermal efficiency can be restrained from deteriorating as a result of changeover of the combustion mode. Besides, a deficiency in the torque of the output gear 20, which becomes deficient due to a decrease in engine power resulting from changeover of the combustion mode, is compensated for through power running control of the second motor-generator 5. Therefore, better efficiency is achieved than in the case where the ignition timing of the internal combustion engine 3 is retarded as in the comparative example.

The foregoing description relates to a concrete example in the case where a request for acceleration is made such that the operating point of the internal combustion engine 3 changes from the stoichiometric combustion region ARa to the lean combustion region ARb. As opposed to the foregoing description, when a request for deceleration is made such that the operating point of the internal combustion engine 3 changes from the lean combustion region ARb to the stoichiometric combustion region ARa, the same control as in the foregoing description is executed except in that the respective parameters during control increase/decrease reversely to the foregoing description, that a surplus torque resulting from a changeover from lean combustion to stoichiometric combustion is absorbed through regenerative control of the second motor-generator 5, that the lean combustion changeover line Lb is used during the control according to the present embodiment of the invention, and the like. Therefore, the presentation of a concrete example or the description thereof is omitted as to a case where a request for deceleration is made such that the operating point of the internal combustion engine 3 changes from the lean combustion region ARb to the stoichiometric combustion region ARa.

Next, an example of a control routine that is executed by the ECU 30 to realize the control according to the aforementioned present embodiment of the invention will be described with reference to FIGS. 7 and 8. The ECU 30 retains a program of the control routine of FIGS. 7 and 8. This program is read out on a timely basis, and is repeatedly executed at predetermined intervals.

In step S1, the ECU 30 acquires an accelerator opening degree by referring to a signal of the accelerator opening degree sensor 31. Subsequently in step S2, the ECU 30 acquires a speed of the vehicle 1 (a vehicle speed) by referring to a signal of the vehicle speed sensor 32.

In step S3, the ECU 30 calculates an engine required power based on the accelerator opening degree acquired in step S1 and the vehicle speed acquired in step S2. Subsequently in step S4, the ECU 30 calculates an operating point of the internal combustion engine 3 at which the engine required power calculated in step S3 can be realized. This operating point is calculated, in principle, as an operating point on the operation line L (see FIG. 2).

In step S5, the ECU 30 compares the engine required power calculated in step S3 with a current engine power, and determines whether or not the engine required power has increased. If the engine required power has increased, the ECU 30 proceeds to step S6. Otherwise, the ECU 30 proceeds to step S10.

In step S6, the ECU 30 determines whether or not the current combustion mode is stoichiometric combustion and will shift to lean combustion in the future. It is determined whether or not the current combustion mode will shift to lean combustion in the future, by estimating, based on an amount of increase in the engine required power, a speed of increase in the engine required power or the like, whether or not the operating point of the internal combustion engine 3 remains in the lean combustion region ARb after shifting from the stoichiometric combustion region ARa to the lean combustion region ARb, and then making the determination based on a result of the estimation. If the current combustion mode is stoichiometric combustion and will shift to lean combustion in the future, the ECU 30 proceeds to step S7. Otherwise, the ECU 30 skips the following processes and ends the current routine.

In step S7, the ECU 30 calculates an engine torque (a required engine torque Ted) at which the engine required power is realized, based on the operating point calculated in step S4, and determines whether or not the required engine torque Ted is larger than a threshold Ta that is determined based on the stoichiometric combustion changeover line La (FIG. 2). This threshold Ta is an engine torque on the stoichiometric combustion changeover line La that corresponds to the engine rotational speed at the operating point calculated in step S4. The ECU 30 determines whether or not the required engine torque Ted is larger than the threshold Ta, thereby making it possible to estimate whether or not the operating point of the internal combustion engine 3 is supposed to cross the stoichiometric combustion changeover line La in order to realize the engine required power. If the required engine torque Ted is larger than the threshold Ta, the ECU 30 proceeds to step S8. Otherwise, the ECU 30 proceeds to step S9.

In step S8, the ECU 30 reduces the fuel injection amount at a timing when the operating point of the internal combustion engine 3 crosses the stoichiometric combustion changeover line La, changes, in a stepped manner, the air-fuel ratio from the target air-fuel ratio of stoichiometric combustion to the target air-fuel ratio of lean combustion, and changes over the combustion mode from stoichiometric combustion to lean combustion. Incidentally, in parallel with this process, the ECU 30 compensates for a deficiency in torque resulting from the reduction in the fuel injection amount, through power running control of the second motor-generator 5. Then, the ECU 30 ends the current routine.

In step S9, since the operating point of the internal combustion engine 3 does not cross the stoichiometric combustion changeover line La, the ECU 30 changes the air-fuel ratio from the target air-fuel ratio of stoichiometric combustion to the target air-fuel ratio of lean combustion according to the same procedure as in the comparative example (FIG. 5) at a timing when the operating point of the internal combustion engine 3 shifts from the stoichiometric combustion region ARa to the lean combustion region ARb, and changes over the combustion mode from stoichiometric combustion to lean combustion. Then, the ECU 30 allows absorption of a surplus torque of the engine torque that is generated through an increase in the fuel injection amount corresponding to an increase in the intake air amount in the preparatory stages of changeover of the combustion mode, through regenerative control of the second motor-generator 5 or ignition timing retardation control of the internal combustion engine 3.

Figure 8:
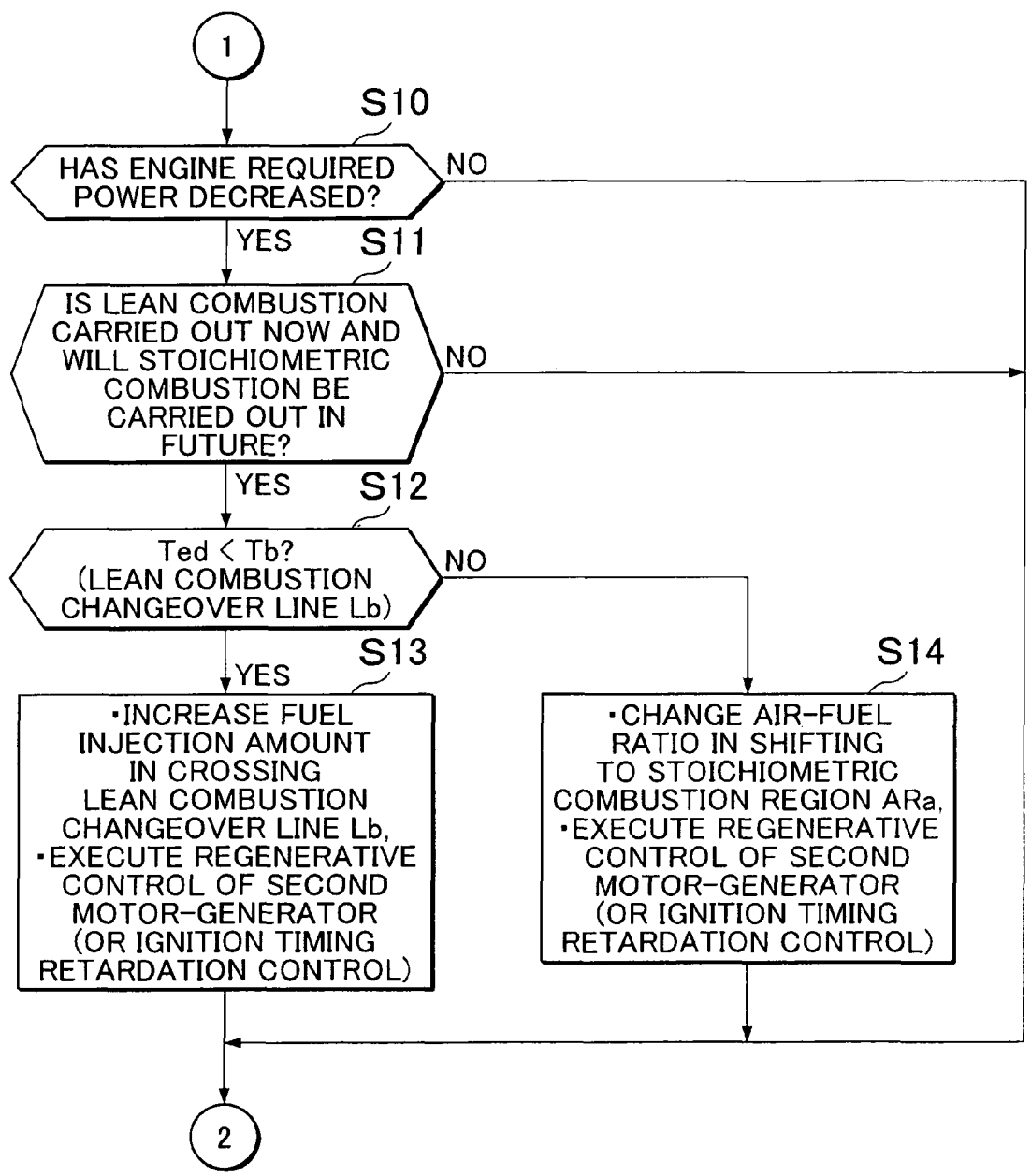
FIG. 8 is a flowchart as a continuation of FIG. 7.

The processes of steps S10 to S14 of FIG. 8 are processes corresponding to a request for deceleration, and are similar to processes corresponding to a request for acceleration in the aforementioned steps S6 to S9. In step S10, the ECU 30 compares the engine required power calculated in step S3 with the current engine power, and determines whether or not the engine required power has decreased. If the engine required power has decreased, the ECU 30 proceeds to step S11. Otherwise, since the engine power is constant, the ECU 30 skips the following processes and ends the current routine.

In step S11, the ECU 30 determines whether or not the current combustion mode is lean combustion and will shift to stoichiometric combustion in the future. It is determined whether or not the current combustion mode will shift to stoichiometric combustion in the future, by estimating, based on an amount of decrease in the engine required power, a speed of decrease in the engine required power or the like, whether or not the operating point of the internal combustion engine 3 remains in the stoichiometric combustion region ARa after shifting from the lean combustion region ARb to the stoichiometric combustion region ARa, and then making the determination based on a result of the estimation. If the current combustion mode is lean combustion and will shift to stoichiometric combustion in the future, the ECU 30 proceeds to step S12. Otherwise, the ECU 30 skips the following processes and ends the current routine.

In step S12, the ECU 30 calculates the required engine torque Ted based on the operating point calculated in step S4, and determines whether or not the required engine torque Ted is larger than a threshold Tb that is determined based on the lean combustion changeover line Lb (FIG. 2). This threshold Tb is an engine torque on the lean combustion changeover line Lb that corresponds to the engine rotational speed at the operating point calculated in step S4. The ECU 30 determines whether or not the required engine torque Ted is smaller than the threshold Tb, thereby making it possible to estimate whether or not the operating point of the internal combustion engine 3 is supposed to cross the lean combustion changeover line Lb in order to realize the engine required power. If the required engine torque Ted is smaller than the threshold Tb, the ECU 30 proceeds to step S13. Otherwise, the ECU 30 proceeds to step S14.

In step S13, the ECU 30 increases the fuel injection amount at a timing when the operating point of the internal combustion engine 3 crosses the lean combustion changeover line Lb, changes, in a stepped manner, the air-fuel ratio from the target air-fuel ratio of lean combustion to the target air-fuel ratio of stoichiometric combustion, and changes over the combustion mode from lean combustion to stoichiometric combustion. Incidentally, in parallel with this process, the ECU 30 allows absorption of a surplus torque of the engine torque that is generated through an increase in the fuel injection amount, through regenerative control of the second motor-generator 5 or ignition timing retardation control of the internal combustion engine 3. Then, the ECU 30 ends the current routine.

In step S14, since the operating point of the internal combustion engine 3 does not cross the lean combustion changeover line Lb, the ECU 30 changes the air-fuel ratio from the target air-fuel ratio of lean combustion to the target air-fuel ratio of stoichiometric combustion according to the same procedure as in the comparative example at a timing when the operating point of the internal combustion engine 3 shifts from the lean combustion region ARb to the stoichiometric combustion region ARa, and changes over the combustion mode from lean combustion to stoichiometric combustion. Then, the ECU 30 allows absorption of a surplus torque of the engine torque that is generated through an increase in the fuel injection amount resulting from changeover of the combustion mode, through regenerative control of the second motor-generator 5 or ignition timing retardation control of the internal combustion engine 3. Then, the ECU 30 ends the current routine.

Figure 7:
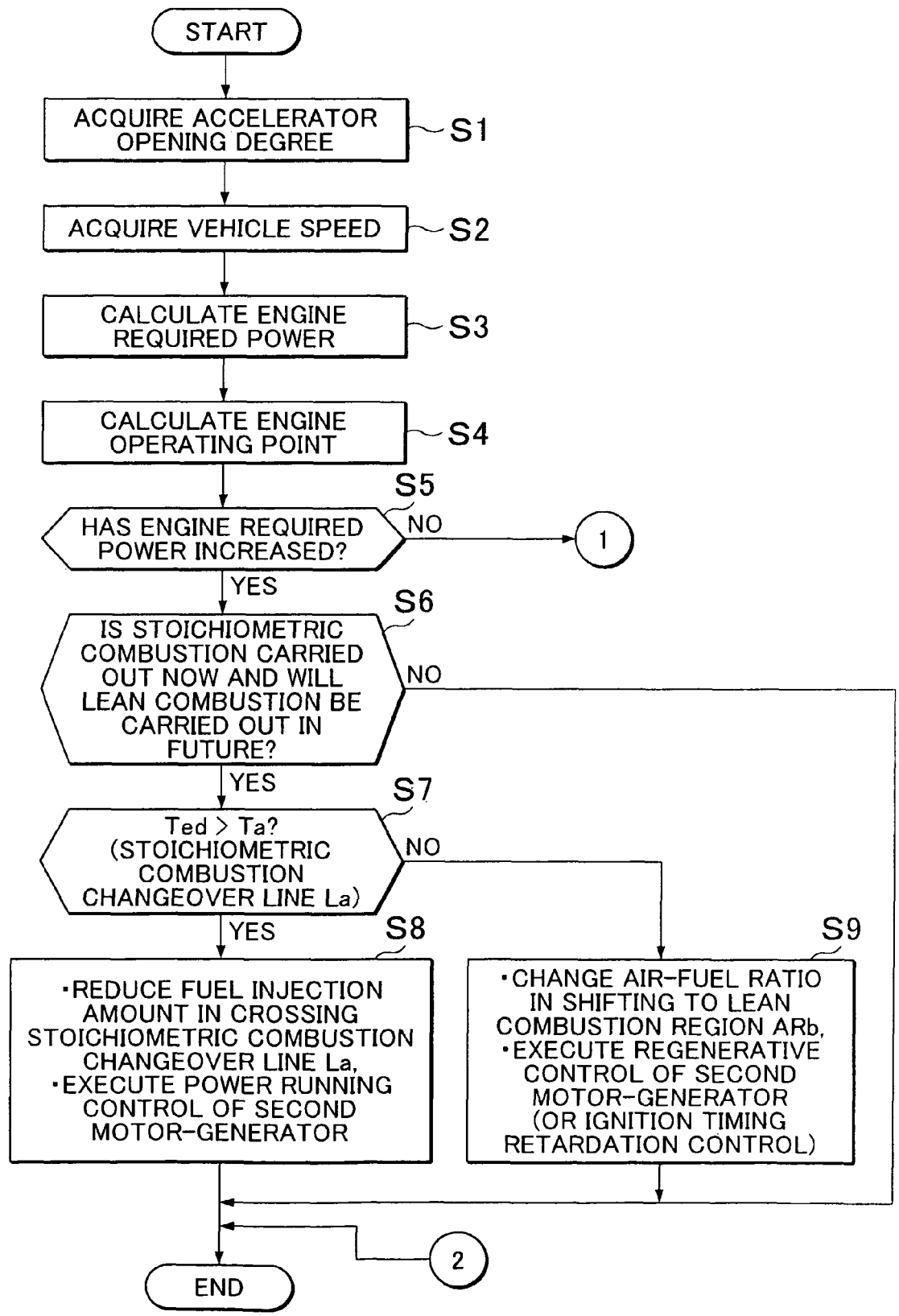
FIG. 7 is a flowchart showing an example of a control routine according to the present embodiment of the invention.

Through the execution of the control routine of FIGS. 7 and 8 by the ECU 30, the combustion mode is changed over when the stoichiometric combustion changeover line La or the lean combustion changeover line Lb at which the thermal efficiency can be maintained before and after changeover of the combustion mode is crossed. Therefore, the thermal efficiency of the internal combustion engine 3 can be restrained from deteriorating after changeover of the combustion mode. Besides, when the operating point of the internal combustion engine 3 crosses the stoichiometric combustion changeover line La or the lean combustion changeover line Lb, the air-fuel ratio is changed in a stepped manner by changing (increasing or reducing) the fuel injection amount. Therefore, the response delay at the time of changeover of the combustion mode can be suppressed in comparison with the comparative example in which the intake air amount is controlled.

The invention is not limited to the aforementioned embodiment thereof, but can be carried out in various modes within the range of the gist of the invention. In the aforementioned embodiment of the invention, the stoichiometric combustion changeover line La and the lean combustion changeover line Lb are set based on the predetermined intake air amount KLx at which the thermal efficiency remains unchanged before and after changeover of the combustion mode. However, the unchanged thermal efficiency before and after changeover of the combustion mode is nothing more than an example. For example, the predetermined intake air amount KLx can be determined as long as the thermal efficiency is confined within a permissible range before and after changeover of the combustion mode, and the stoichiometric combustion changeover line La and the lean combustion changeover line Lb can also be set based on the predetermined intake air amount KLx. The permissible range may be appropriately set. However, for example, it is possible to set a permissible range R to ± several % as shown in FIG. 2.

In the aforementioned embodiment of the invention, the control apparatus is applied to the hybrid vehicle that is equipped with the first motor-generator and the second motor-generator. However, the control apparatus according to the invention is also applicable to an internal combustion engine that is mounted in a hybrid vehicle that is configured such that a single motor-generator is coupled to an output portion such as an output gear, an output shaft or the like to which an engine torque is transmitted.

Besides, the control apparatus according to the invention is not absolutely required to be applied to an internal combustion engine that is mounted in a hybrid vehicle. For example, the control apparatus according to the invention is also applicable to an internal combustion engine for a vehicle that is mounted with the internal combustion engine as the only power source for running. In this case, a fluctuation in engine torque resulting from changeover of the combustion mode can be suppressed through ignition timing retardation control of the internal combustion engine. Therefore, torque suppression means is realized by executing ignition timing retardation control.

What is claimed is:

1. A control apparatus for an internal combustion engine, the internal combustion engine including a torque suppression device that is configured to adjust an output torque of an output portion to which a torque of the internal combustion engine is transmitted, the control apparatus comprising:
    an ECU that is configured to change, in a stepped manner, an air-fuel ratio of the internal combustion engine so as to change over a combustion mode of the internal combustion engine between lean combustion and stoichiometric combustion, when an operating point of the internal combustion engine satisfies a first changeover condition that is defined by a rotational speed and a torque of the internal combustion engine, wherein
    the first changeover condition is defined by the rotational speed and the torque that correspond to a predetermined intake air amount at which a thermal efficiency of the internal combustion engine is maintained before and after changeover of the combustion mode, and
    the ECU is configured to control the torque suppression device such that the torque suppression device suppresses a fluctuation in the torque of the internal combustion engine that is generated as the air-fuel ratio changes in the stepped manner, in changing over the combustion mode.

2. The control apparatus according to claim 1, wherein
    the torque suppression device includes a motor-generator that transmits a motor torque to the output portion, and
    the ECU is configured to execute power running control or regenerative control of the motor-generator such that the motor-generator suppresses the fluctuation in the torque of the internal combustion engine.

3. The control apparatus according to claim 1, wherein
    the internal combustion engine includes an intake air amount adjustment device that is configured to adjust an amount of intake air sucked into the internal combustion engine,
    the torque suppression device is configured to adjust an ignition timing of the internal combustion engine such that the torque suppression device adjusts the torque of the output portion,
    the ECU is configured to determine, based on a second changeover condition that is defined by the rotational speed and the torque of the internal combustion engine, whether or not the combustion mode needs to be changed over, when an operating point of the internal combustion engine that is determined in accordance with a request to accelerate the internal combustion engine or a request to decelerate the internal combustion engine does not satisfy the first changeover condition,
    the second changeover condition is set as a region in which the lean combustion is carried out and a region in which the stoichiometric combustion is carried out, which are defined by the rotational speed and the torque of the internal combustion engine,
    the ECU is configured to control the intake air amount adjustment device such that the intake air amount adjustment device makes the intake air amount equal to an intake air amount that is needed for a target air-fuel ratio after changeover of the combustion mode, when the ECU determines that the combustion mode needs to be changed over,
    the ECU is configured to change the air-fuel ratio of the internal combustion engine so as to change over the combustion mode of the internal combustion engine between lean combustion and stoichiometric combustion, when the ECU determines that the combustion mode needs to be changed over, and
    the ECU is configured to adjust the ignition timing such that the torque suppression device suppresses a fluctuation in the torque of the internal combustion engine that is generated as the intake air amount is controlled, in changing over the combustion mode.

* * * * *